March 22, 1966 E. BEYERLE 3,242,267
VOICE-FREQUENCY SIGNAL RECEIVER WITH SPEECH-IMMUNITY CIRCUIT
Filed Nov. 13, 1962
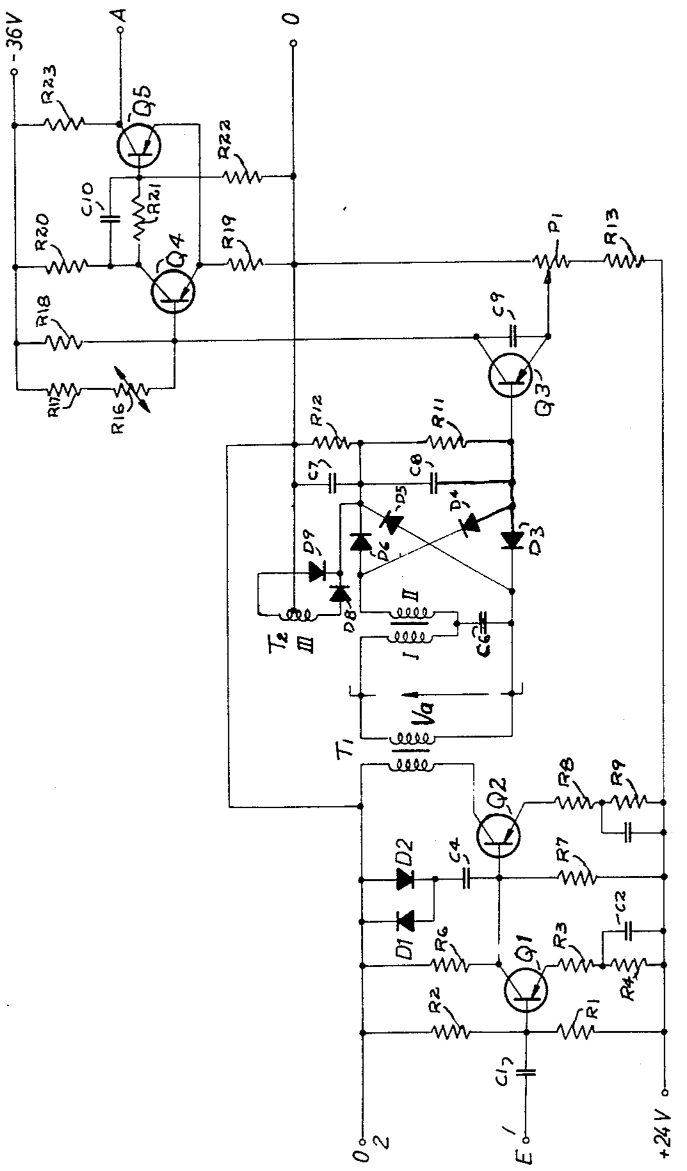
INVENTOR.
E. BEYERLE
BY Phillip A. Weiss
atty.

United States Patent Office 3,242,267
Patented Mar. 22, 1966

3,242,267
VOICE-FREQUENCY SIGNAL RECEIVER WITH SPEECH-IMMUNITY CIRCUIT

Ernst Beyerle, Fellbach, Wurttemberg, Germany, assignor to International Standard Electric Corporation, New York, N.Y., a corporation of Delaware

Filed Nov. 13, 1962, Ser. No. 237,181
Claims priority, application Germany, Nov. 16, 1961, St 18,569
7 Claims. (Cl. 179—84)

The invention relates to a V.-F. signal receiver with speech-immunity circuit in telecommunication, particularly telephone systems.

At the transmission of signals within the voice-frequency range, particularly of V.-F. ringing-, dialling-, and control-signals over toll lines in telecommunication systems with amplifiers, it is necessary to have the receivers provided for these signals constantly connected to the transmission path. It is therefore required to block these receivers against speech frequencies or noise voltages, because the speech frequencies are transmitted on the same transmission path.

In order to obtain suitable protection against wrong signals caused by the speech, the V.-F. receivers are equipped with speech-immunity circuits designed in such a way that only the signal receiver operates, if the signal frequency solely arrives over the transmission path. All frequencies outside the signal-frequency range block the signal receiver. Even if the signal frequency is included in the speech frequencies, the blocking is still effective so that the signal receiver does not furnish a faulty output signal. For all of these signal receiving methods it is necessary that on the transmitting end speech transmission and signal transmission are time separated.

Various speech-immunity circuits are known. In some V.-F. receivers known a parallel-resonant circuit tuned to the signal frequency, is inserted into the plate circuit of a preordinated amplifier tube and series-connected with a series-resonant circuit, tuned to the same frequency. The voltages occurring in the circuits are rectified and led to two separate relays, one serving as a receiving relay, the other one as a speech-immunity relay.

In another solution of the problem the rectified voltages are led to a common receiving relay having two opposite windings. This relay only operates if the locking circuit does not furnish any output voltage, that is, if only the signal frequency is applied to the parallel-resonant circuit.

These well known arrangements require a large expenditure for filters to separate the signal frequency and speech frequencies. Even with the many filter arrangements they still exhibit a very high speech sensitivity.

Other voice-frequency signal receivers are known which minimize pulse distortions. Limiter circuits and regulating devices are used with these receivers to insure that a constant voltage is provided at the filter input independent of the receiving amplitude at the signal-receiver input. By this method the filter circuits may be simplified.

In order to keep the expense of filters in signal receivers as small as possible and to none the less receive a non-distorted output signal with speech imunity, another known arrangement separates the frequencies across a bridge circuit. One arm of the bridge is formed by a series-resonance circuit tuned to the signal frequency. From this component or branch the signal frequency is derived. The blocking voltage is tapped from the zero-point branch of the bridge.

Such bridge circuit arrangements are advantageous in that the range of the signal frequency required is very small, and that frequencies near the signal-frequency range already cause extensive blocking. The high speech immunity of such circuits is however, obtained only by the use of an expensive bridge circuit, particularly the transformers required to derive the signal frequency. Simplification of the bridge circuit, such as by converting to a resistance bridge, causes high attenuation which reduces the ear responding sensitivity of the signal receiver. Thus, it means more amplifiers are required.

Therefore, an object of this invention is to provide new, efficient and unique voice-frequency receivers with speech immunity.

Another object of this invention is to provide voice frequency receivers that separate the control signal frequencies with a minimum of equipment.

A further object of this invention is to provide voice frequency receivers employing series resonant circuits that use mutual inductance in the tank to provide a narrow bandwidth and a high degree of voice immunization.

In accordance with a preferred embodiment of the voice frequency receiver of this invention all frequencies, speech and signal, occurring at the output of a non-selective preamplifier, are connected to a series-resonant circuit formed by the mutual inductance of a transformer and a capacitor. The resonant circuit is tuned to the signal frequency. The signal frequency is connected over an additional winding of the transformer to control the receiving switching means. Since the series-resonant circuit is of high quality a narrow signal-frequency range results therefrom. Obtaining the signal frequency over the additional winding of the transformer permits the optimum matching of the receiving switching means to the series-resonance circuit. A separate output from the series-resonance circuit is used to provide the blocking voltages. Derivation of the voltages is selected in such a way that rectified signal voltage and rectified blocking voltage occurring across the series-resonance circuit are series-connected in opposite directions in the control circuit of the receiving-switching means. According to a further development of the signal receiver in compliance with the invention several series-resonance circuits are provided at the output of the preamplifier, these circuits are tuned to different frequencies and connected to the pertinent receiving-circuit elements. It is possible thereby to obtain in a simple manner, a multi-frequency receiver in which the individual signal-frequency receiving circuits have separate blocking circuits. The correct functioning of the multi-frequency receiver requires that the code signals be selected in such a way that only one of the connected one-frequency receivers is operated at a time. The signal receiver, according to the invention, provides a pre-amplifier that is equipped with an amplitude limiter or is an AGC pre-amplifier which furnishes a constant output signal for all input signals within a certain amplitude range.

The V.-F. signal receiver will be explained in greater detail with reference to the single drawing.

Means are provided for amplifying the input signals. The amplifier shown in the drawing has two stages. The active element in each stage is a PNP transistor Q1 and Q2 respectively. The first stage amplifier is coupled to the transmission line through its input terminal 1, 2. The base of transistor Q1 is connected to terminal 1 through coupling capacitor C1. Biasing is obtained over the voltage divider comprising R1, R2. The base of transistor Q1 is coupled to the point of coupling of the two resistors R1, R2. The other side of R1 is connected to the positive voltage source while the other side of resistor R2 is connected to terminal 2 which is grounded.

The emitter of transistor Q1 is connected to the positive voltage supply through bias resistors R3, R4. Filter capacitor C2 shunts resistor R4 to stabilize the first stage.

The collector of transistor Q1 is connected to ground through load resistor R6. The base of transistor Q2 is also connected to the collector of transistor Q1.

The base of transistor Q2 is connected to positive voltage through bias resistor R7. The bias current thus flows from positive voltage through resistors R7, R6 to ground. The collector of transistor Q2 is connected to positive voltage through series bias resistors R8, R9. Filter capacitor C3 shunts resistor R9. The load for transistor Q2 is transformer T1.

Means are provided for obtaining a constant voltage output from the two stage amplifier. In greater detail, a limiting circuit such as that comprising diodes D1, D2 and capacitor C4 is connected to the coupling point of transistors Q1 and Q2.

Means, such as transformer T2 in series with capacitor C6, are provided for separating out the control signals from the received signals. In greater detail, transformer T2 is comprised of three windings. The mutual inductance of windings I, II in combination with the capacitance of C6 resonates at a frequency equivalent to the control signal frequency. Thus, when a voltage output V*a* from the two stage amplifier is connected across the series combination of winding I of transformer T2 and capacitor C6. The voltages with the control signal frequency flow through the resonant circuit and are thus effectively shorted. However, a voltage is induced in winding III by the control signal voltages in winding II.

Means are provided for rectifying the output of transformer T2; such as a full wave bridge rectifier across winding II and a full wave rectifier across winding III. The full wave bridge rectifier comprises diodes D3–D6 and filter capacitor C6. The full wave rectifier comprises diodes D8, D9 and filter capacitor C7.

Means are provided for algebraically adding the rectified signals obtained from the control signals and speech signals and amplifying this sum. In greater detail, circuitry such as PNP transistor Q3 and associated components is provided. The base of transistor Q3 is connected directly to the positive output portion of the rectifying bridge and to ground through resistors R11, R12. The negative voltage output of the bridge and the full wave rectifier is connected to the junction of resistors R11, R12. The emitter of transistor Q3 is biased by coupling to the wiper of potentiometer P1. Potentiometer P1 is connected in series wth resistor R13 between ground and positive potential. The output at the collector of transistor Q3 controls a receiving element such as a Schmitt trigger circuit. A feedback filter capacitor C9 connects the emitter and collector of transistor Q3.

The Schmitt trigger circuit shown comprises transistors Q4, Q5 which only conduct alternately. The base of transistor 5 is connected to the negative potential source through variable resistor R16 in series with resistor R17. Bias resistor R18 bridges both resistor R16, R17. The emitter of transistor Q4 is connected to ground through bias resistor R17. Load resistor R20 connects its collector to negative voltage. Transistor Q4 is coupled to transistor Q5 through resistor R21 bridged by capacitor C10.

The base of transistor Q5 is biased by resistor R22 connected to the junction point of resistor R19 and the emitter of Q4 as is well known practice with this type of trigger circuit. The collector of transistor Q3 is connected to negative potential through resistor R23 and it is also connected directly to output terminal A. Thus, normally transistor Q4 conducts and output A is negative. When transistor Q3 conducts, transistor Q4 is turned off and transistor Q5 conducts effectively placing ground at output terminal A. Transistor Q3 conducts only when speech signals are not present along with the control signals and thus the control signals are not blocked.

The operation of the circuit will now be explained. The voltages arriving over the transmission path are connected across the input (E–O) of the signal receiver. The voltages are amplified to a required amplitude via a pre-amplifier consisting of the transistors Q1 and Q2. A limiter circuit is provided between the first and the second amplifier stage in order to obtain a constant output voltage V*a* from the pre-amplifier over the entire receiving-level range. This circuit is a series-connected circuit well known to those skilled in the art, namely a capacitor C4 and the parallel-connected diodes D1 and D2 operating in opposite directions.

The output voltage V*a* is connected to the series-resonant circuit tuned to the signal frequency. In order to give this circuit high quality, the resonant-circuit inductance is formed by the mutual inductance of the two symmetrical windings I and II of the transformer T2. Thus, the resonant circuit frequency curve is very steep and only a narrow signal-frequency range will pass through winding III. All other frequencies are normally restricted to the output of the resonant circuit (winding II and capacitor C). Only if the signal frequency arrives alone will the rectified voltage derived from winding III switch the Schmitt-trigger that is used as a receiving element with the transistors Q4 and Q5. At the output, A, resistance ground potential is normally found. If, however, speech is transmitted on the path, the speech-immunity circuit also furnishes an output voltage which cancels the control voltage furnished by the signal circuit. Both voltages are series-connected in opposite direction in the control circuit of transistor Q3. The amplified output voltage of Q3 switches the Schmitt-trigger when the blocking speech voltage is present. The output A then is at a negative potential.

As may further be understood from the drawing several signal-receiving circuits tuned to different signal frequencies, may be connected to the output of the pre-amplifier. This is indicated by several lines on the secondary side of the output transformer.

The amplifier transistor Q3 serves to increase the control and the blocking voltage. Instead of the limiter circuit in the pre-amplifier also a pre-amplifier with AGC may be used in order to keep the output voltage V*a* constant. Thereby only a small portion of the resonance curve of the series-resonance will be used and therefrom results a very small signal-frequency range independent of the signal level.

While the principles of the invention have been described above in connection with specific apparatus and applications, it is to be understood that this description is made only by way of example and not as a limitation on the scope of the invention.

What is claimed is:

1. A voice frequency signalling system comprising means for receiving voice frequency signals that include speech signals and control signals, said control signals employing a pre-determined portion of the entire voice frequency range, said receiving means comprising selective circuit means including series-resonant circuit means comprising mutual inductance for separating said control signals from said speech signals, trigger means having a normal condition and an operated condition, trigger control means inductively coupled to said selective circuit means responsive to said received voice frequency signals including control signals, and summing means included in said trigger control means acting responsive to said received voice frequency signals including only control signals for operating said trigger means to said operated condition and acting responsive to said received voice frequency signals including speech signals for blocking said trigger control means to operate said trigger means to said normal condition.

2. In the voice frequency signalling system of claim 1 wherein said selective circuit means comprises non-selective pre-amplifier means providing a constant amplitude output signal.

3. In the voice frequency signalling system of claim 1 wherein said selective circuit means comprises non-selective pre-amplifier means having amplitude limited outputs.

4. In the voice frequency signalling system of claim 2 wherein said selective circuit means comprises series resonant filter means, transformer means for coupling said pre-amplifier to said filter means, said filter means tuned to resonance at said control signal frequencies with capacitor means and the mutual inductance of said transformer means.

5. In the voice frequency signalling system of claim 4 wherein said transformer means comprises three winding transformer means connected to give speech signals across one of said windings in series with said capacitor means and control signal across another of said windings.

6. In the voice frequency signalling system of claim 5, first rectifying means for rectifying said control signals, second rectifying means for rectifying said speech signals, and wherein said summing means comprises means for series connecting said rectified signals for controlling said trigger control means.

7. In the voice frequency signalling system of claim 1 wherein a plurality of said filter means are coupled to said pre-amplifier means, each of said filter means being tuned to different frequencies, individual ones of said trigger means associated with each filter means, and individual ones of said trigger control means associated with each of said filter means whereby only one trigger circuit is operated at any time responsive to its particular control signal frequency.

References Cited by the Examiner

UNITED STATES PATENTS

| | | | |
|---|---|---|---|
| 2,686,227 | 8/1954 | Ryall | 179—84 |
| 2,935,572 | 5/1960 | Hastings et al. | 179—84 |
| 2,964,650 | 12/1960 | Radcliff et al. | 179—84 |
| 3,076,059 | 1/1963 | Meacham et al. | 179—84 |
| 3,098,179 | 7/1963 | Van Rossum et al. | 179—84 |
| 3,103,558 | 9/1963 | Ligotky | 179—84 |

ROBERT H. ROSE, *Primary Examiner.*

WALTER L. LYNDE, *Examiner.*